Jan. 26, 1960     C. R. AYERS ET AL     2,922,661

RECORD BOOK

Filed Oct. 4, 1956     3 Sheets-Sheet 1

INVENTORS
Clarence R. Ayers, William F. Jureit
William Bond

BY Diggins & LeBlanc

ATTORNEYS

Jan. 26, 1960 C. R. AYERS ET AL 2,922,661
RECORD BOOK
Filed Oct. 4, 1956 3 Sheets-Sheet 2

INVENTORS
Clarence R. Ayers, William F. Jureit
and William Bond
BY
ATTORNEYS

Jan. 26, 1960     C. R. AYERS ET AL     2,922,661
RECORD BOOK

Filed Oct. 4, 1956     3 Sheets-Sheet 3

Fig. 4

INVENTORS
Clarence R. Ayers, William E. Jureit
and William Bond
BY Diggins & LeBlanc
ATTORNEYS

United States Patent Office 2,922,661
Patented Jan. 26, 1960

2,922,661

RECORD BOOK

Clarence R. Ayers, Coral Gables, and William F. Jureit and William Bond, Miami, Fla.

Application October 4, 1956, Serial No. 613,962

2 Claims. (Cl. 282—22)

The present invention relates to financial record books and more particularly to a single financial record book in which complete information relating to all phases of the finances of a business enterprise may be recorded.

In conventional bookkeeping systems, the various types of financial data are listed in separate record books. A record of checks issued is retained on check stubs of a check book and also in a cash-disbursements journal thereby requiring two separate entries in the record books for each check issued. Cash receipts are kept in a cash-receipts journal and deposit slips are retained as a record of bank deposits. In consequence, four physically distinct records, a check book, two journals, and deposit slips, must be maintained to reflect the financial transactions of a business. Further, existing bookkeeping systems utilizing the single-posting payroll system require the employer to open a separate payroll checking account or at least to employ special payroll checks and check books for handling payroll items, thereby further increasing the number of record books which must be maintained.

In accordance with the present invention there is provided a single book in which all financial records of a business enterprise may be recorded. The single book of the present invention serves as a check book for general items, as a cash-receipts and cash-disbursements journal and as a record of bank deposits. In addition to these functions and concurrently with its utilization for such purposes, the book may serve as the cash-disbursements journal and check book for a single-posting payroll system.

The book comprises a loose-leaf type binder and a plurality of leaves or sheets having a vertical row of apertures along their inner margins which cooperate with the rings of the binder to retain the sheets therein. The left and right pages of each set of sheets are employed in conjunction with one another for related entries. A left-hand section of each left-hand page is provided with rows and columns in which may be entered cash-receipts and a duplicate record of bank deposit slips, the payor listings of the duplicate deposit slips serving also as the payor listings for the cash-receipts journal. The right-hand section of each left-hand page is employed for the same purpose as the stubs of a check book, this section having an overlay of vertically staggered checks.

Each check has along its right-hand edge a plurality of vertically aligned apertures which cooperate with the rings of the binder to retain the checks in the ledger. Further each check has a horizontal strip across the top in which is entered the information relating to the check number, date of issue, payee and amount in numbers of the check, the checks being vertically staggered so that this strip of each check is exposed. The back of this horizontally-extending strip of the check is provided with a pressure sensitive transferable medium, such as carbon paper, so that when the check is made out the information recited above is transferred directly to rows and columns in the ledger which are to receive this information.

The entire right-hand page of the ledger is employed as a cash-disbursements journal, the horizontally-extending rows of which are aligned with the check stub rows on the left-hand page. Each right-hand page is divided into a plurality of vertical columns, each column being designated by a particular type of disbursement so that by checking the appropriate column or entering therein the check number, amount of the check and/or the date, the type of disbursement may be indicated. Consequently, the payee entry on the check stubs also serves as the payee entry for the cash-disbursements journal.

If it is desired to employ the book for payroll purposes, also, several of the vertical columns of the right-hand page may be assigned to payroll information while the same checks are employed as for all other disbursements. For the purposes of the payroll system two forms are provided. One form is a payroll slip which is placed in the employee's pay envelope and on which is recorded, in a horizontal strip across the top, the pay period, social security (F.I.C.A.) tax, withholding tax, gross earnings and/or other pertinent information. The back of this portion of the slip is also provided with a pressure sensitive transferable medium.

A separate personal payroll record is maintained for each employee, the record having rows and columns corresponding with those on the payroll slip; the rows and columns of each of these corresponding with the rows and columns on the right-hand page of the journal. The personal payroll record and the payroll slip each has along one edge a plurality of slots having the same vertical spacing as the ring binders of the book so that the forms may be aligned with a check stub and the corresponding column of the disbursement section. Carbon paper is placed under the payroll form and when the required information is recorded on the individual slips it is transferred to the individual payroll forms and the appropriate columns and rows of the disbursement section of the journal through the medium of the carbon paper.

Each vertical row of the journal of the present invention may be totaled at the bottom of the page thereby readily supplying all information relating to total bank deposits, total cash-receipts in each classification and total amounts disbursed for each classification of disbursements, thus becoming a ledger.

It is a broad object of the present invention to provide a single financial journal in which may be recorded all financial transactions of a business concern.

It is another object of the present invention to provide a single financial journal to serve as a cash-receipts and cash-disbursements journal, a check book, a record of bank deposits and a payroll journal.

Still another object of the present invention is to provide a financial journal employing a loose-leaf type binder and a plurality of appropriately arranged sheets which are adapted to cooperate in part with vertically staggered checks, secured to the rings of the binder, which journal serves as a check book and a ledger for cash receipts and cash disbursements.

Yet another object of the present invention is to provide a financial journal employing a loose-leaf type binder and a plurality of appropriately arranged sheets which are adapted to cooperate in part with vertically staggered checks, secured to the rings of the binders, which journal serves as a check book and a journal and general ledger for cash receipts and cash disbursements, and which cooperates with individual payroll slips and payroll forms to provide a single-entry payroll system.

It is another object of the present invention to provide a simple and economical financial book which may be employed to eliminate much of the duplication of records encountered in present bookkeeping systems.

The above and still further objects, features and advantages of the present invention will become apparent upon consideration of the following detailed description of one specific embodiment thereof, especially when taken in conjunction with the accompanying drawings, wherein:

Figure 1 illustrates the left-hand page of the journal of the present invention;

Figure 2 illustrates the right-hand page of each set of sheets of the journal of the present invention; and Figure 3 illustrates the journal of the present invention open and having the bottom check turned over to show the carbon strip on the back thereof and having a payroll card in position; and Figure 4 illustrates an enlarged version of the payroll cards and slips of the invention.

Referring specifically to Figure 1 of the accompanying drawings there is illustrated a first side of a sheet 1 of the journal of the present invention marked "Page No. 2." Along the right-hand edge of Page No. 2 there is provided a plurality of vertically aligned apertures 3 which as will appear subsequently are employed in conjunction with a ring binder. Page No. 2 is divided into a plurality of vertically-extending columns A through J, the columns A through F being employed as a daily journal and record of bank deposits and the columns G through J being employed as a record of checks issued. The columns C through F may be headed to show the source of funds deposited in the bank, while the column A is employed to record the date of the deposit slip and the column B is employed to record the date of the deposit and the total amount thereof.

To record the duplicate deposit slip, an original deposit slip is laid over a piece of carbon in the column A so that the horizontal rows of the deposit slip are aligned with the rows of column A. The deposit slip is then filled-in in the usual manner, each item deposited being shown separately, and this information is recorded directly in the column A through the medium of the carbon paper. The deposit slip is then totaled and the total amount is entered in the column B, the date of the deposit also being entered in this column.

The columns C through F have recorded therein the amount of each check deposited, the source of which corresponds with the heading of the column. The rows B through F may all be totaled, the total being shown in the row entitled "Total This Page." The summation of the totals of the columns C through F should equal the total of the column B and this provides a ready check on the accuracy of the totals of the deposit slips.

As previously indicated the columns G through J serve the same function as the stubs of a conventional check book. When a check is written, as will subsequently appear, the number and date of the check are entered in the column G, the payee is entered in column I, the amount of the check is entered in column J and a running bank balance is kept in column H. The balance shown in the column H is obtained by adding the amounts in the column B and subtracting the amount of the check designated in column J. Since a running bank balance is kept in the column H, the balance shown in the row corresponding to the last check to be written may be entered directly in the lowermost row on the page which designates "Total To Be Carried Forward."

The totals in the column C through F are entered in the third from last row of the page. The totals brought forward from previous pages are entered in the next to the last row of the page and the summation of these two rows is entered in the lowermost row, this amount being indicative of the total receipts in accordance with each designated type of receipt as indicated by the headings in these columns, thereby becoming a general ledger.

Referring now to Figure 2 of the accompanying drawings where there is illustrated the other side of the sheet of Figure 1 which is marked "Page No. 3." This page is divided into columns K through Z, the columns L through Z, inclusive, being headed to designate different categories of disbursements.

After each check is written the amount of the check may be entered in the appropriate column L through Z to thus identify the category of the disbursement. After all checks on a page have been written, the total of each column of the page is entered in the third from last row of the page to indicate the total of each type of disbursement. The cumulative total of prior pages is brought forward from the bottom line of the preceding page and placed in the line marked "Total Brought Forward." The total of the page and the total brought forward are then summed to provide a total on each page of the cash-disbursement for each category of item thus becoming a general ledger and this amount may then be recorded on the next page in the row titled "Total Brought Forward" and this procedure followed from page to page.

The rows of Page No. 3 illustrated in Figure 2 are aligned with corresponding rows in the check-stub section of Page No. 2 so that, as will appear subsequently, the items recorded in the columns G through J on Page No. 2 have a corresponding line on Page No. 3.

Referring specifically to Figure 3 of the accompanying drawings, there is illustrated a complete journal 5 having a front cover 6, a back cover 7 and a ring binder 8 including a plurality of rings 9, the sheets 1 being retained in the ledger 5 by the rings 9 of the binder 8 which cooperate with vertically-aligned apertures 3 in sheet 1. When the journal 5 is open as indicated in Figure 3 Pages No. 2 and No. 3 constitute the left and right-hand pages, respectively, of the open journal.

A plurality of blank checks 10 overlay the columns G through J of Page No. 2, the checks 10 being vertically staggered so as to expose at the upper edge of each check a horizontal strip 11 having a vertical height equal to the spacing between horizontal lines on Pages No. 2 in the columns G through J.

Each check 10 is provided with a plurality of vertically-aligned apertures 12 which cooperate with the rings 9 of the binder 8 to secure the checks to the binder and further to maintain each check aligned with its corresponding row of the columns G through J. A left-hand portion 13 of each check, having a horizontal length equal to the length of the vertical column G, is adapted to receive information relating to the check number and the date of the check. A second portion 14 of the horizontal strip 11 of the check 10 is aligned with the vertical column I of the Page No. 2 and is adapted to receive information relating to the check payee. The right-hand portion 15 of the horizontal strip 11 of the check 10 is adapted to receive the information relating to the amount of the check.

The lowermost check 10 illustrated in Figure 3 is folded over the right-hand page thereby exposing the back of the check and it will be noted that the portion of the back of the check co-extensive with the horizontal strip 11 is provided with a pressure sensitive transferable medium 16 such as carbon paper. Thus, when the check is filled-out the information relating to the number, date, payee and amount is recorded directly in the row of the left-hand page corresponding to the position of the check on the page. In consequence, by merely filling-out the check, the check stub, which is to be recorded in the columns G through J, is filled out simultaneously with the check thereby eliminating the usual practice of filling out a check, a separate check stub and making a journal entry for each check written.

The amount of the check may thereafter be entered in one of the columns L through Z which designates the category of the disbursement paid by the check. Since the rows of the right-hand page are aligned with the check stub rows of the left-hand page, the payee entry in column I of the left-hand page also designates the person to whom the type of disbursement indicated on the right-hand page is to be paid. Consequently, the payee entry on the check stub taken together with the entry in one of the columns L–Z constitutes a cash-disbursement journal.

The journal as thus far described, therefore, provides a cash-receipt and cash-disbursement journal, duplicate deposit slip and a check book. The names recorded in the duplicate deposit slips also serve to indicate the source of funds recorded in the columns C through F and therefore the column A in cooperation with the columns C through F provide a cash-receipt journal. It is apparent that the journal of the present invention eliminates the necessity of maintaining separate books and having to make separate entry in each of the various types of financial books normally employed, the journal of the present invention greatly reducing the number of books required to a minimum of one and further greatly reducing the amount of duplication normally encountered in recording information in the various types of books of the prior art system.

The journal of the present invention may also be employed in a single entry payroll system. A card 17, only the upper portion of which is illustrated in Figure 3, is maintained for each employee and is intended to provide full information concerning that employee. His personal payroll record is kept thereon to facilitate the preparation of quarterly social security and withholding tax returns as well as information required by the Fair Labor Standards Act.

There is further provided a payroll slip 18, which is prepared each payday for each employee to determine his gross compensation. An enlarged view of a card 17 and slip 18 are shown in Figure 4. The slips 18 are intended to be clipped to the employee's pay check and placed in the individual employee's pay envelopes.

The card 17 is provided at its left-hand edge with a plurality of tabs 19 which are adapted to cooperate with the rings 9 of the ledger 5 to align the card 17 with the individual rows of the right-hand page and the rows of the check book portion of the left-hand page of the ledger. The card 17 is provided with five columns, the four right-handmost columns being designated respectively as "FICA Tax," "Income Tax Withheld," "Other Deductions" and "Gross Earnings."

The payroll slip 18 is also provided at its left-hand edge with a plurality of tabs 20 which cooperate with the rings 9 of the binder 8 to align the slip with the rows of the card 17 and the rows of the left and right-hand pages of the journal at the same time. An upper horizontal strip 21 of the slip 18 is divided into five vertical columns corresponding with the five columns of the card 17 and being designated by the same column markings. The upper horizontal strip 21 of the slip 18 is provided on its back surface with a pressure sensitive transferable material 22 such as carbon paper which is shown in Figure 4 where a corner of slip 18 is bent over to show this material.

When it is desired to make an entry on a slip 18, a card 17, and on the right-hand page of the journal, a sheet of carbon paper 23, an upper portion of which is illustrated in Figure 3, is laid on the right-hand page along the edge of the rings 9. The individual earning-record card 17 is placed above the carbon paper 23 with the left margin of the card placed against the binder 8 in such fashion that the tabs 19 slip into the spaces between the rings 9. The card 17 is laid over the right-hand page so that the next vacant line of the card 17 is opposite the top line of the next blank check 10 that is in position to be written.

The pay slip 18 is then placed on the top of the card 17 so that the top line of the pay slip 18 is also opposite the next blank check that is in position to be written. The various tax and other deduction information is then entered in the appropriate blanks in the horizontal strip 21 at the top of the slip 18 and then the check is made out to the employee. The check is torn out of the book and the pay slip is attached to it so that the employee received full information concerning his gross pay and deduction.

The individual earnings-record card 17 shows the payroll information for the employee in permanent form and the same information is recorded in the journal by means of the carbon paper 23. The same process may be repeated for each pay check until all are completed. The card 17 and the slip 18 are illustrated out of proportion in Figure 4 so as to more easily illustrate the operation of the single entry payroll system.

It should be understood that the vertical columns of the card 17 and slip 18 are of the same horizontal length and are aligned with the four columns L through O of the right-hand page of the journal. Consequently, when the journal of the present invention is also employed as the posting medium for a single posting payroll system, the columns L through O of the right-hand page of the journal are set aside for payroll deduction information. The total of each of these columns on the page, and the total of the columns from the preceding page or pages is brought forward to provide all the information necessary to an employer to inform him of the total taxes and other deductions withheld from the individual employee.

It is obvious from the above that the present invention provides a single financial record book in which an employer may record substantially all financial information necessary for the operation of his business. Not only does the book of the present invention provide a single source of financial information, but the arrangement of the information in the book is such that a considerable amount of the duplication encountered in the prior art bookkeeping systems is eliminated. Thus, the filling out of the check immediately provides for the cash-disbursement journal the name of the person to whom the cash-disbursement is made, while the filling out of the bank deposit slip provides for the cash-receipts journal, the name of the individual or corporation or company from whom a particular cash-receipt was received. Although specific uses for each of the columns of the journal of the present invention have been set forth above, it is apparent that the use to which a particular column may be put would depend upon the individual desires of the company or persons utilizing the book and it is not intended to restrict the invention to specific uses for each column of the journal.

While we have described and illustrated one specific embodiment of our invention, it will be clear that variations of the general arrangement and of the details of construction which are specifically illustrated and described may be resorted to without departing from the true spirit and scope of the invention as defined in the appended claims.

What we claim is:

1. A financial record book having a plurality of pairs of left and right-hand pages, each of said left-hand pages having a first plurality of visible lines dividing a left-hand portion of said left-hand page into a first predetermined number of horizontal rows and vertical columns, a second plurality of visible lines dividing a right-hand portion of said left-hand page into a second predetermined number of horizontal rows and vertical columns, a third plurality of visible lines dividing each of said right-hand pages into a predetermined number of horizontal rows and vertical columns, the spacing of rows on the right side of said left-hand page and on said right-hand page being equal, ring binder means including a plurality of equally spaced binder rings for holding said pages and for aligning said last-mentioned horizontal rows, a plurality of blank checks associated with the right side of each of said left-hand pages, each of said checks having as a part thereof a horizontal strip adjacent its upper edge to receive in spaced horizontal locations information relating to payee and amount of check, a strip of pressure transferable material on the back of said check underlying said horizontal strip of said check, said binder means securing said checks in vertically staggered relation with said horizontal strip of each check exposed and aligned with a horizontal row and a plurality of vertical columns of the right side of their associated left-hand pages, a payroll slip having visible lines defining a horizontal strip along its upper margin divided into a plurality of vertical columns having a spacing equal to the spacing of the vertical columns of said right-hand page, a transferable medium underlying the horizontal strip, a payroll card having visible lines dividing it into a plurality of horizontal rows and vertical columns, the latter being equal in number and spacing to the vertical columns of said payroll slip, both said slip and card having a plurality of vertically-aligned horizontally-extending tabs along one edge thereof, said tabs having a width equal to the spacing between the rings of said ring binder means, said tabs and said ring binder means cooperating to align said horizontal strip of said slip and said horizontal rows of said card with the horizontal rows of said right-hand page and to align said vertical columns of said slip and card with the vertical columns of said right-hand pages, the spacing of the rings of said ring binder means being equal to the spacing between the visible lines defining said aligned horizontal rows on said pages.

2. The combination in accordance with claim 1, wherein said checks have a perforated vertical line to facilitate removal of said checks from said ledger.

References Cited in the file of this patent

UNITED STATES PATENTS

| | | |
|---|---|---|
| 1,107,351 | Proudfit | Aug. 18, 1914 |
| 2,142,229 | Wolling | Jan. 3, 1939 |
| 2,470,586 | Tathwell | May 17, 1949 |
| 2,647,765 | Brechner | Aug. 4, 1953 |
| 2,687,902 | Becker | Aug. 31, 1954 |

FOREIGN PATENTS

| | | |
|---|---|---|
| 607,428 | Great Britain | Aug. 31, 1948 |